(12) United States Patent
Finn (10) Patent No.: US 12,222,749 B2
(45) Date of Patent: Feb. 11, 2025

(54) MODULAR POWER NETWORK DEVICE

(71) Applicant: ELECTRICITY EXCHANGE DAC, Limerick (IE)

(72) Inventor: Paddy Finn, Tipperary (IE)

(73) Assignee: ELECTRICITY EXCHANGE DAC (IE)

( * ) Notice: Subject to any disclaimer, the term of this patent is extended or adjusted under 35 U.S.C. 154(b) by 104 days.

(21) Appl. No.: 18/154,173

(22) Filed: Jan. 13, 2023

(65) Prior Publication Data

US 2023/0145829 A1 May 11, 2023

Related U.S. Application Data

(62) Division of application No. 17/045,333, filed as application No. PCT/EP2018/058932 on Apr. 6, 2018, now Pat. No. 11,593,238.

(51) Int. Cl.
| | |
|---|---|
| *G06F 1/12* | (2006.01) |
| *G06F 1/10* | (2006.01) |
| *G06F 1/26* | (2006.01) |
| *G06F 11/22* | (2006.01) |
| *G06F 13/36* | (2006.01) |
| *G08B 13/14* | (2006.01) |
| *H04L 7/00* | (2006.01) |
| *H02J 13/00* | (2006.01) |

(52) U.S. Cl.
CPC ............. *G06F 1/12* (2013.01); *G06F 1/10* (2013.01); *G06F 1/26* (2013.01); *G06F 13/36* (2013.01); *G08B 13/1436* (2013.01); *H04L 7/0033* (2013.01); *H04L 7/0037* (2013.01); *G06F 11/221* (2013.01); *G06F 2213/40* (2013.01); *H02J 13/00002* (2020.01); *H02J 13/00006* (2020.01); *H02J 2203/10* (2020.01)

(58) Field of Classification Search
CPC ... G06F 1/10; G06F 1/12; G06F 13/36; G06F 11/221; G06F 2213/40; H04L 7/0033; H04L 7/0037
See application file for complete search history.

(56) References Cited

U.S. PATENT DOCUMENTS

| | | | |
|---|---|---|---|
| 8,321,612 B2 * | 11/2012 | Hartwich | H04J 3/0655 |
| | | | 710/110 |
| 2012/0187770 A1 * | 7/2012 | Slota | H02J 3/42 |
| | | | 307/87 |

(Continued)

FOREIGN PATENT DOCUMENTS

| | | | | |
|---|---|---|---|---|
| EP | 1256858 | A2 * | 11/2002 | ......... G05B 19/0421 |
| WO | WO-2017115163 | A1 * | 7/2017 | |

*Primary Examiner* — Glenn A. Auve
(74) *Attorney, Agent, or Firm* — Shumaker, Loop & Kendrick, LLP; Jeffrey B. Fabian (57) ABSTRACT

A modular system is described which can provide high frequency monitoring of power use and responsive control as well as enabling network connectivity for centralised monitoring and operation. One modular system consists of a communications bus, end caps, and a combination of the modules providing communications, power metering, relay control and battery backup. Each modular system can be configured with a combination of modular units as needed for the application. A combination of bus communication monitoring and tilt detection provides security against external tampering after installation.

9 Claims, 5 Drawing Sheets

(56) References Cited

U.S. PATENT DOCUMENTS

2014/0258573 A1* 9/2014 Johnson ............ H04L 12/40084
710/110
2017/0257019 A1* 9/2017 Galek ................... H02M 1/088
2019/0079548 A1* 3/2019 Buffenbarger .... H02J 13/00002

* cited by examiner

MODULAR POWER NETWORK DEVICE

CROSS-REFERENCE TO RELATED APPLICATIONS AND PRIORITY

The present application claims priority from International Application No. PCT/EP2018/058932, filed on Apr. 6, 2018, which is hereby expressly incorporated herein by reference in its entirety. The present application is also a divisional application that claims priority from U.S. application Ser. No. 17/045,333, which is hereby expressly incorporated herein by reference in its entirety.

TECHNICAL FIELD

This invention relates to a modular system for communication and control of aspects of a power network, for example a power grid network.

BACKGROUND

Demand on electrical grids fluctuates depending on a number of factors including, for example, seasonal effects and the time of day. Industrial and domestic users have differing electrical needs, with industrial users in particular requiring very stable and predictable supply. Fluctuations in the power supply for certain industrial processes may have very serious consequences, ranging from damage to process equipment to process failure as a result of a loss or other interruption of a stable power supply. It is desirable therefore to provide a means of ensuring that power supply is capable of being monitored with a high degree of accuracy and furthermore that rapid changes in demand across an electrical grid can be catered for in real time and with a high degree of flexibility.

Providing reliable means for monitoring and controlling power use can provide for additional stability in an electrical grid whereby, for example, certain electricity users can reduce their demand by turning off or turning down certain electrical loads for a period of time. Other users may be able to operate back-up generation or battery systems for a period of time to counter the impact of a source of instability. Furthermore, some users may be able to run low-cost generation if they operate combined heat and power (CHP) generation or other, low-cost generation on a regular schedule.

SUMMARY

An aspect of the present invention includes a modular communication system that includes a system bus; a central processing unit ("CPU") having at least one input and one output; at least two end modules having a plurality of connection points for receiving data from the system bus or transmitting data through the system bus, where the end modules are configured to provide a looped transmission path through the CPU. The CPU is configured to indicate a discontinuity in the system bus if a transmission from the at least one CPU output to at least one connection point of at least one end module is not received by the at least one CPU input.

The system bus provides the main communication conduit between modules in the modular system. The end module provides the advantage of providing an efficient manner of providing an indication at the CPU of discontinuity in the system bus, for example an interruption in transmission as a result of, for example, tampering with the bus or the modular system or a fault in the bus.

A point within a system of points can be routed through each of the end modules and returned to the original source of the transmission. The end modules may be placed at opposite ends of the modular system. The end modules may in effect "bookend" the modular system. A transmission from at least one node in the system will follow a path through all connected nodes. This is advantageous as a discontinuity at any point along the bus length may be detected.

The transmission from the at least one CPU output may comprise random generated code. This is advantageous as it provides for a simple implementation. No specific instruction is required to be transmitted in order to indicate a discontinuity. Rather, all that is required is for a break in transmission to be detected.

The transmission from the at least one CPU output may be sent periodically. This is advantageous as it allows for a discontinuity, for example as a result of tampering, to be checked over period of time, i.e. it provides for more than a once off check.

The transmission may be transmitted from the at least one CPU output over a first transmission path and the transmission may be received by the at least one CPU input over a second transmission path, the first and second transmission paths forming a looped transmission path.

In effect, the transmission may be transmitted from the at least one point over a first transmission path and the transmission may be received by the transmitting point over the same transmission path. This is advantageous as it provides for a "looped" path from the end module, through the modular system, and back to the end module. As such, discontinuities throughout the system can be detected.

The CPU may further comprise means for providing information corresponding to the discontinuity in the system bus. This is advantageous as it provides information to a user about the nature of the discontinuity.

The information may comprise information corresponding to at least one of a physical break in the system bus, the duration of discontinuity in the system bus, the time of discontinuity in the system bus. This is advantageous as it provides information to a user which can be used for reporting and analysis.

The CPU may further comprise an external connector. This is advantageous as it provides for insertion into a further modular system or, for example, for data extraction from the module to an external memory.

An aspect of the present invention provides a module for a modular communication system comprising a tamper indicator, the indicator comprising a detecting means for detecting a change in position of the module. This is advantageous as once a module is fixed in place, a subsequent change in position of the module, made without authorization provides a strong indication of tampering with the module.

The means for detecting a change in position of the module may comprise an accelerometer. This is advantageous as an accelerometer is sensitive to changes in position. Movement or a change in position of the module is detectable by an accelerometer.

A module comprising the indicator may be mounted on a horizontal support. Modules for the modular system are typically mounted on a horizontal support, therefore it is advantageous for the indicator to be able to detect changes in position with respect to a horizontal support.

The horizontal support may be a DIN rail. A DIN rail is a metal rail of a standard type widely used for mounting electrical and other industrial equipment, typically inside equipment racks. As such, it is advantageous for the indicator to be able to detect changes in position when the module is mounted on a DIN rail.

The accelerometer may be configured to detect a movement of the module in relation to the horizontal support. The movement may be a tilting movement. This is typically how tampering will occur, with the module being moved away from or tilted away from its support in an attempt to remove or inspect the module. As such, it is advantageous for the indicator to be able to detect such changes in position.

The accelerometer may be configured to detect a tilting movement from an axis perpendicular to the horizontal support. This is advantageous as it provides for detection of movement only within an angular range that typically indicates tampering as opposed to minor nudges to the module by personnel in the vicinity or vibration type movements.

The accelerometer may be further configured to trigger an alarm upon detection of a tilting movement from an axis perpendicular to the horizontal support. This is advantageous as a tilt in the given range is a likely indicator of tampering and therefore an alert is provided.

Another aspect of the present invention provides a method of synchronizing communication across a plurality of interconnected modules powered by a common power source. The method includes the steps of analyzing the input signal of the common power source at a first module of the plurality of modules, and analyzing the input signal of the common power source at a second module of the plurality of modules. The method also includes the steps of detecting a feature in the input signal at a time $t1$ at the first module, and detecting the feature in the input signal at a time $t3$ at the second module, and comparing $t1$ and $t3$ to a reference time signal at the first or second module to provide an indication of delay in communication between the first module and the second module.

The communication from the plurality of interconnected modules may comprise transmission of data and the method may further comprise adjusting the transmission of data from the second module based on the indication of delay.

A plurality of interconnected modules may be distributed throughout a given network. These modules may communicate with each other and further communicate with a centralized server. The modules may be powered by a common power source, for example, by mains power. As such, the signal corresponding to the common power source provides for synchronization of data, as each module may compare its data transmission to a specific point on the common power source signal. Thus a common reference across a plurality of modules is provided. This may then be compared to a reference time signal which is known to be accurate. For example, $t1$ and $t3$ may be compared to a reference GPS timing signal which will provide an indication of the delay in communication between the first and second module. This method is advantageous as it provides for synchronization of data from multiple sources. Synchronization is important, for example, for correct reporting of data to the centralised server.

In another aspect of the system, adjusting the transmission of data from the second module may include the steps of transmitting at time $t3$, data generated at a time $t1$ by the first module and transferred to the second module in a time $t2$ and data generated by the second module at a time $t1$ where $t3$ is equal to $t1+t2$. This provides that when $t3$ equals $t1+t2$, transmission of data may occur upon detection of the feature of the input signal.

Adjusting the transmission of data from the second module may comprise the steps of transmitting at time $t4$, data generated at a time $t1$ by the first module, and transferred to the second module in a time $t2$, and data generated by the second module at a time $t1$, where $t4$ is greater than $t1+t2$. This provides that when $t4$ is greater than $t1+t2$, transmission of data may occur at a time after detection of the feature of the input signal. This allows for transmission to be scheduled for a later period while still providing for the transmitted data to be synced.

A system may be configured to carry out the method as described.

An aspect of the present invention includes a method of adjusting power at a plurality of nodes in a power grid network. The method includes the step of providing to a server from a first node of the plurality of nodes, a first indication of a power demand at the first node. A further step provides to a server, from a second node of the plurality of nodes, a second indication of a power demand at the second node. Next the server calculates a trigger point for each of the plurality of nodes based on the received first and second indications. The server provides a trigger point to each of the plurality of nodes. The method further includes the step of adjusting the power demand for at least one of the plurality of nodes based on the trigger point provided by the server.

The above described method provides that nodes operating in a power grid network can provide information as to their power demand—i.e., can provide an indication as to their capability to generate more power or their requirement for more power consumption. This information can be used by a server to provide a trigger point to each node. The trigger point may indicate that a node should adjust its power demand. For example the node should generate more power, or alternatively, that the node may consume more power as required.

Adjusting the power demand may comprise increasing the power consumed by the node or decreasing the power consumed by the node. This is advantageous as it provides that the power consumption at a given node may be adjustable to meet a change in demand within the power grid network.

Adjusting the power demand may comprise increasing the power generated by the node or decreasing the power generated by the node. This is advantageous as it provides that the power generation at a given node may be adjustable to meet a change in demand within the power grid network.

The trigger point may be a power frequency. The method may further include the steps of comparing a measured frequency at at least one of the plurality of nodes to the trigger point. The trigger point may be provided as a power frequency thus providing a reference point which can be detected and measured by a given node. Comparing the measured frequency to the trigger point provides an efficient manner of determining if adjustment of power demand at the node should be undertaken.

The method may further comprise adjusting the power demand for at least one of the plurality of nodes when the measured power frequency exceeds the trigger point. This is advantageous as it provides for an effective manner of adjusting power demand at a node as required. It is further advantageous as the adjustment in power demand may occur instantaneously as soon as the exceeded frequency is detected. This obviates the need for any further communication with the server to adjust power demand.

An aspect of the present invention includes a system for adjusting power at a plurality of nodes in a power grid network. The system includes a means for providing from a first node of the plurality of nodes to a server, a first indication of a power demand at the first node. The system also includes a means for providing from a second node of the plurality of nodes to a server, a second indication of a power demand at the second node, and a means for calculating at the server a trigger point for each of the plurality of nodes based on the received first and second indications. The system further includes a means for adjusting the power demand at at least one of the plurality of nodes based on the trigger point provided by the server.

DETAILED DESCRIPTION

The invention will now be described with reference to the accompanying figures.

A modular system for monitoring of electricity use and providing for rapid response to changes in electricity demand is provided. The modular system may be placed in a plurality of sites, or nodes, where electricity being generated or consumed is to be monitored. The modular systems may communicate with a central server or command which monitors data on electricity usage from each of the distributed modular systems.

Figure 1:
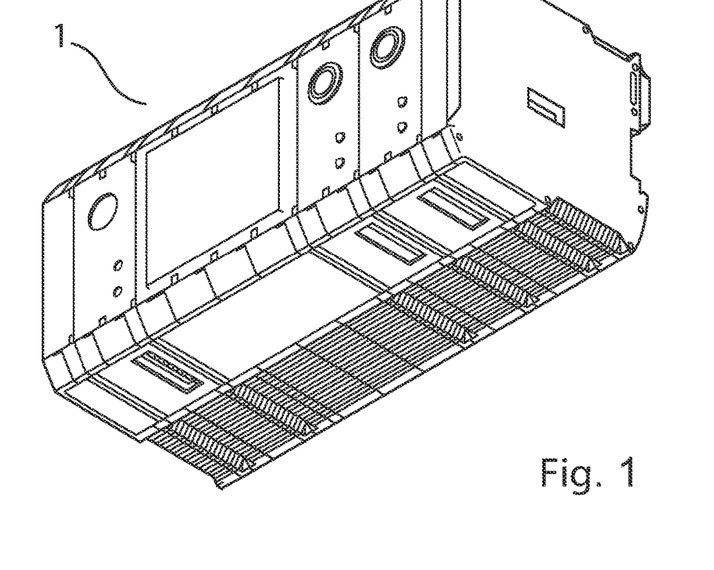
FIG. 1 is a representation of a modular system for monitoring and control of a power network.

The modules forming the modular system 1 may be housed in a series of enclosures as shown in FIG. 1. An example of the component parts of the modular system of the invention is provided in FIG. 2. The components parts are described below.

Modules

Figure 2:
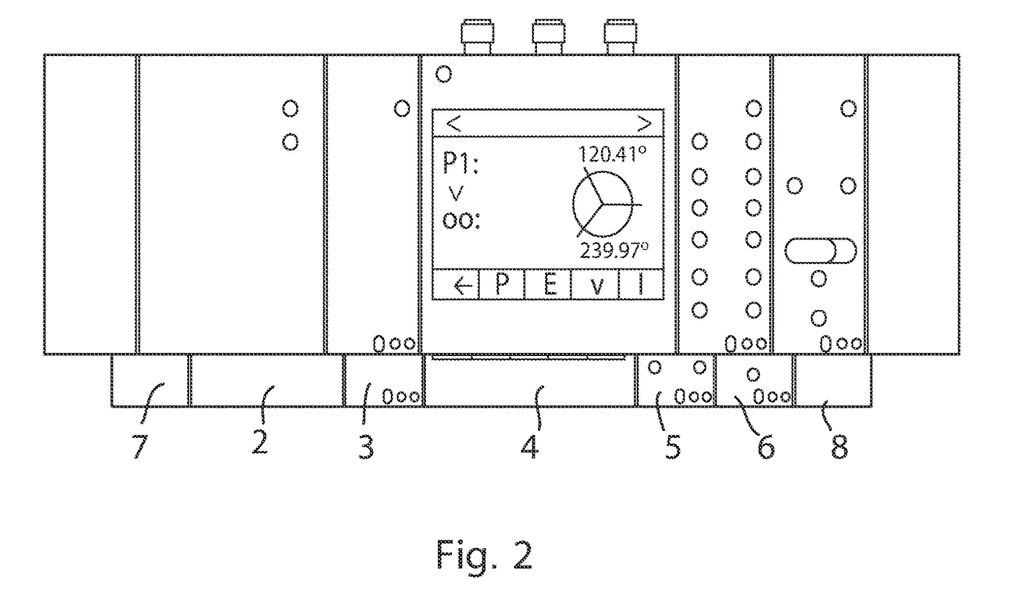
FIG. 2 is a schematic representation of a modular system for monitoring and control of a power network.

The modules comprise a battery pack 2, power supply 3, communications gateway 4, power meter 5, relay 6 and end caps 7, 8 (left and right).

The battery pack 2 provides back-up to the 12 V dc common bus rail in the event of a power outage.

The power supply 3 inputs 100-250 V AC and supplies 12 V DC to a common bus.

The communications gateway 4 provides for primary communications, computation, data storage, and human interaction module. In addition, remote configuration and updating of underlying modules is carried out through this module. The communications gateway further provides a synchronising timing signal (PPS) to underlying modules.

The power meter 5 provides dual 3-phase power meter. The meter contains zero-crossing circuitry to enable per voltage cycle calculation of voltage frequency. It further provides RS-485, Ethernet, and Optocoupler interfaces and selectable CT type: 5 A or 333 mV.

The relay 6 provides a software controllable 2PDT latching relay. The relay also provides for a manual override capability. The relay and manual override switch status are reflected in inputs to a host microcontroller.

End caps 7, 8 are provided at the right and left ends of the module. The end caps provide flat end caps with no inter-module connectors on the end faces. The caps internally terminate CAN-FD busses. This provides for enabling of the 'Electronic Bolt' security feature used to detect tampering (described further below). The end caps further act as a switch on the power lines ensuring that the end caps are in place before the system powers up.

Bus

Figure 3:
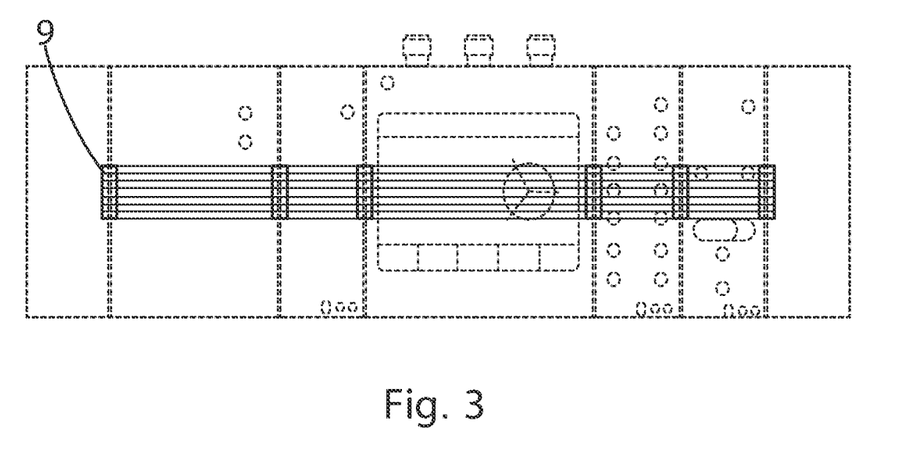
FIG. 3 is a schematic representation of a system bus of the modular system.

The modules may be interlinked by a common system bus 9 (FIG. 3). A common bus provides power and communications to all connected modules. The bus may be interlinked by a male connector on one side of a given module and the female on the other side. Amongst other functions, the common bus provides for enabling the implementation of tamper detection as described further below.

It is desirable for the connector to be centred and horizontal in orientation as shown in FIG. 3. End cap PCB traces and components should be on inward facing layer to prevent tampering. The bus may be configured with lines as follows: power (4 lines), communications (4 lines), synchronisation signal (1 line) and electronic bolt (2 lines).

The bus provides power (4 lines) 12V/GND or otherwise as required by design, for example, an additional −12V line may be desirable. End caps act as a system power switch, as shown below, to prevent modules from powering up and attempting to establish communications prematurely during installation.

The communications (4 lines) lines may be 2×CAN Flexible Data-Rate (FD) busses (5+ Mbps) with 120Ω terminating resistors located on each end cap.

The synchronisation signal (1 Line) may be one pulse-per-second, driven by the communications gateway module. The signal may be used to time synchronise all connected modules. The signal may be Active high or low as required by the user.

The electronic bolt comprises two lines. A main processor periodically sends random code to the right over the UART. This provides that tampering may be indicated if this is not received from the left.

The enumeration signal (1 line) may use microcontroller GPIO and pull-down resistors in the end caps to determine the order of connected modules from left to right. This assumes GPIO is in a high-impedance state on reset. An example operation is described below: Enumeration Routine: (Carried out on reset. Enumerator=0 at start)
1. Set left and right GPIO to Input and read values
2. If left='1' then wait until '0' to proceed; While waiting, update enumerator as new values received on CAN-FD Bus
3. Transmit ID and ++enumerator on CAN-FD Bus.
4. If right='0' (last module) then send 'End Enumeration' packet on CAN-FD Bus else if right='1' then set Right to Output logic '0'
5. On sending or receipt of 'End Enumeration' packet on CAN-FD Bus, set left and right GPIO to high impedance states and exit Enumeration routine.

The above provides an overview of the modular system on the whole. A number of specific functions and features of the modular system will now be described.

Tamper Detection

The integrity of data provided by the module system is critical to the decision making as to how power in a given network should be managed and distributed. Any tampering with data, for example to provide for increased figures for financial gain, would have a detrimental effect on the overall effectiveness and accuracy of the system. To prevent to corruption of data by such means, the modular system provides "tamper proof" features. The end modules or end caps provide one such tamper proof feature.

The end caps act to restrict access to the system bus. The end caps comprise a plurality of points for receiving or transmitting data from the system bus. The end module is configured to indicate to the CPU a discontinuity in the system bus if a transmission from at least one point of the end module is not received by a second point of the end module. The system bus provides the main communication conduit between modules in the modular system.

The transmission from the at least one point of the end module may comprise a transmission to a corresponding point of a second end module. This is shown for example in FIG. 4 wherein the first transmission path travels from the left end cap through the main CPU UART to a corresponding point of the right end cap. The end modules may be placed at opposite ends of the modular system. The end modules may in effect "bookend" the modular system. See for example, end caps 7 and 8 in FIGS. 3 and 4.

Figure 4:
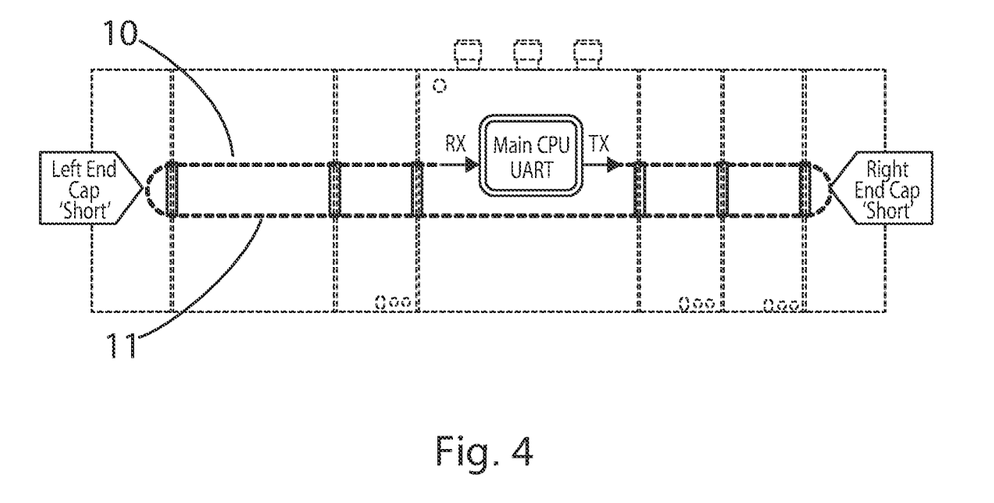
FIG. 4 is a schematic representation of a "looped" path in the system bus of the modular system.

In operation, a transmission may be transmitted from the CPU over a first transmission path 10 and the transmission received by a second point of an end cap over a second transmission path 11. This is advantageous as it provides for a "looped" path from the end module, through the modular system, and back to the end module. As such, discontinuities throughout the system can be detected. In this manner, the loop acts as an "electronic bolt." This is shown for example in FIG. 4 wherein the first transmission path travels from the left end cap through the main CPU UART to a corresponding point of the right end cap and is effectively looped back from the right end cap back to the left end cap. The transmission may take the form of the main processor periodically sending random generated code to the right over the UART. Tampering is indicated if this is not received from the left (FIG. 4).

Tamper Indicator

Figure 5A:
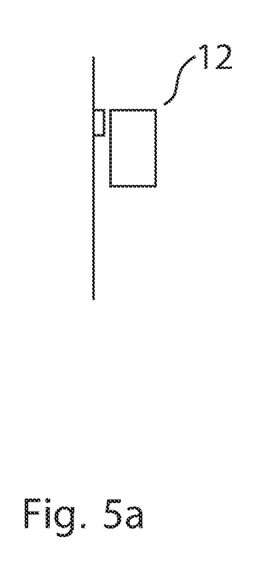
FIG. 5a is a schematic representation of a module comprising a tamper indicator aspect of the invention.
Figure 5B:
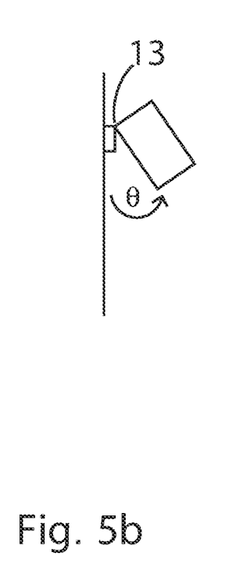
FIG. 5b is a schematic representation of a module comprising a tamper indicator aspect of the invention.

FIGS. 5a and 5b are a schematic representation of a module comprising a tamper indicator aspect of the invention. The indicator comprises a detecting means for detecting a change in position of the module. This is advantageous as once a module is fixed in place, a subsequent change in position of the module without authorization provides a strong indication of tampering with the module.

The means for detecting a change in position of the module comprises an accelerometer. Movement or a change in position of the module is detectable by an accelerometer.

With reference to FIG. 5a, a module 12 comprising the indicator is mounted on a horizontal support, for example a DIN rail 13.

The accelerometer is configured to detect a movement of the module in relation to the horizontal support. For example with reference to FIG. 5b, the movement may be a tilting movement wherein the module is tilted away from the DIN. This is typically how tampering will occur, with the module being moved away from or tilted away from its support in an attempt to remove or inspect the module.

The module is tilted out from the support at an angle $\theta$. The accelerometer is configured to detect such tilting movement for a given angle $\theta$ from an axis perpendicular to the horizontal support. If an angle of $\theta$ degrees, an alarm is triggered.

Data Synchronization

Figure 6:
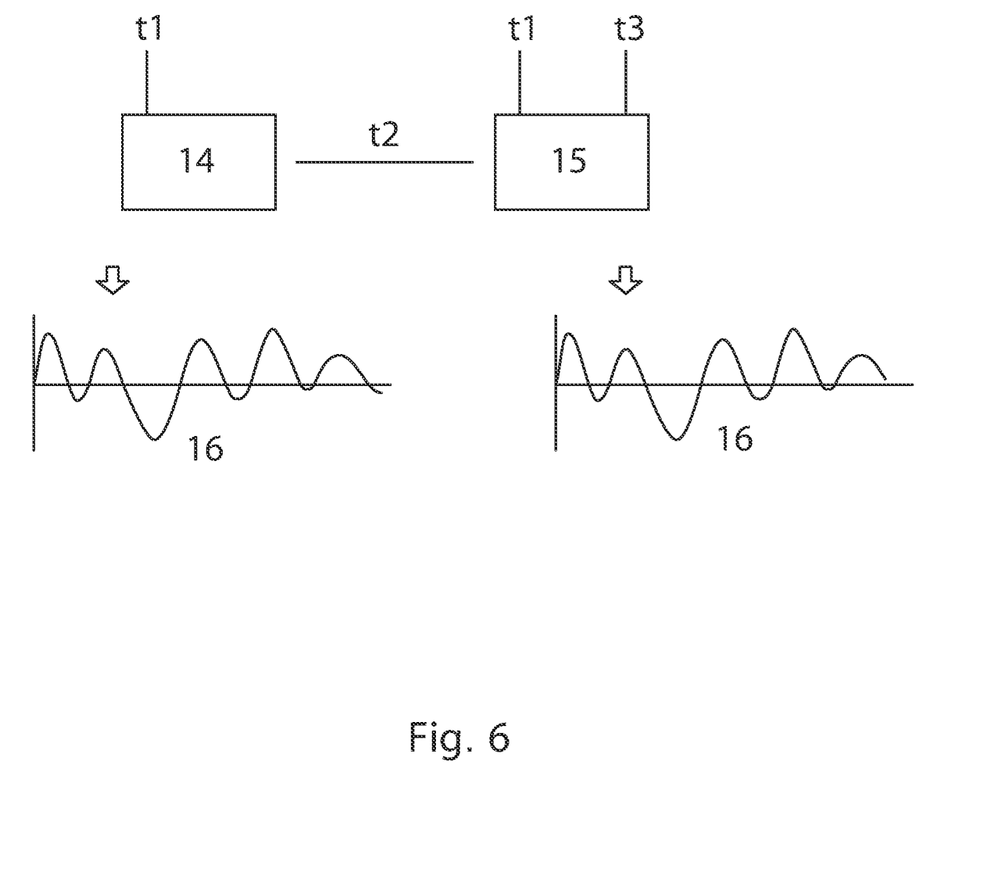
FIG. 6 is a schematic representation of a data synchronization aspect of the invention.

FIG. 6 is a schematic representation of a data synchronization aspect of the invention. Two modules 14, 15 forming part of an interconnected network of modules are shown. Periodically, the modules send data either to other modules or to a centralized server. In FIG. 6, the modules wish to send information about their condition at a time t1 to another modules or to the centralised server. For this example, it is taken that the information is to be sent to the centralised server. Depending on a number of network factors, for example, the speed of the respective modules communication circuit and/or the modules position in the network, data sent from module 14 to the server and data sent from module 15 to the server at a time t1 may not reach the server simultaneously. As such, the data received at the server is not synchronized. This is problematic especially when the server may be required to make very quick decisions regarding allocation of resources to modules through the network. Non-synchronized data may therefore lead to the server distributing resources in a non-optimal manner.

The modules 14, 15 are powered by a common power source, for example a mains power. The power source therefore has a characteristic signal 16 which is capable of being analyzed at both modules. Data from module 14 is sent to module 15 at a time t1. Simultaneously, the first module 14 detects a feature of the power signal indicated by the arrow in FIG. 6. The data takes a time t2 to be transferred from module 14 to module 15. This data may be stored temporarily in module 15 for transmission to the server. Data is further created at module 15 at time t1. This data may also be stored temporarily in module 15 for transmission to the server. The second module 15 may subsequently also detect the same feature of the power signal 16 (as previously detected by module 14) at a time t3. Thus, t3 and t1 may be compared to a reference time signal, for example a GPS time signal at module 14 or 15, to determine an absolute time and a corresponding delay for data transmissions from module 14 and 15. Furthermore, at time t3, module 2 contains data from module 14 corresponding to time t1 and data from module 15 corresponding to time t1 and thus may transmit this data to the server as synchronised data. The data may be transmitted at a time t3, i.e., immediately upon detection of the common feature. Alternatively, the data may be transmitted at a time t4 (not shown), i.e., at a time after detection of the common feature. In either case, the transmitted data is synchronised in that it was produced in both module 14 and module 15 at a time t1.

Discrete System Response

Figure 7:
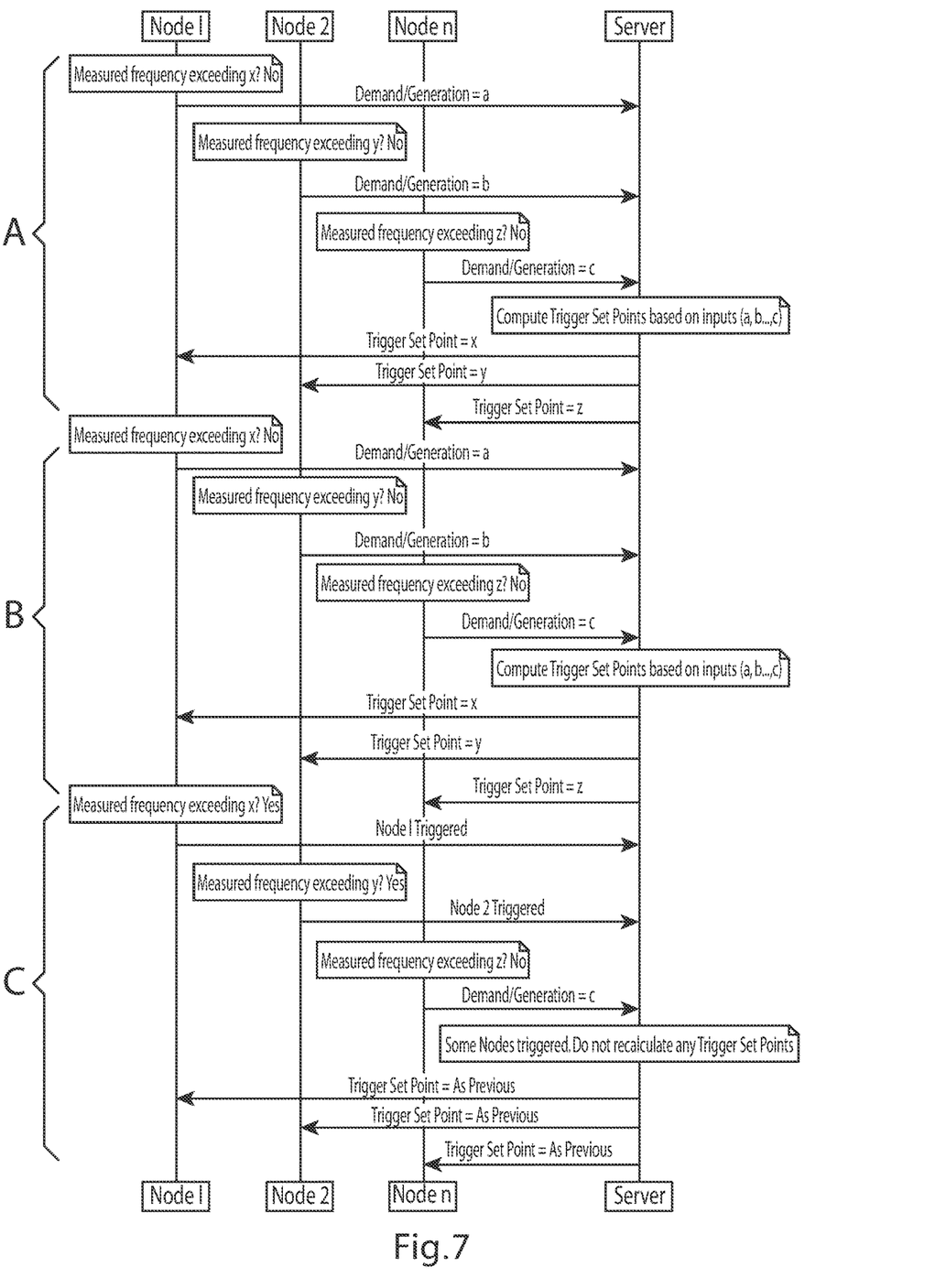
FIG. 7 is a flow diagram of a method for adjusting power at a plurality of nodes in a power grid network.

FIG. 7 is a flowchart representing discrete power adjustment within a multi-nodal system. Node 1, node 2 and node n represent nodes within an electrical network or grid. Each of nodes 1, 2 and n are capable of both the consumption of power provided to the node via the network and the generation of power to be fed back into the network. It should be noted that nodes 1, 2 and n are presented as an example and that node n represents the nth node in a set of nodes, 1 to n.

Each of the nodes 1 to n informs a server as to how much power is being consumed by the node or alternatively, how much power is being generated by the node. This provides that the server may determine by how much these values can potentially be changed, for example, whether a node can consume more or less power or whether a node can generate more or less power.

The server then transmits frequency set points, individual for each node, at which the node can provide a discrete response, i.e., each node can be configured to trigger a given discrete response. For example, a node may be triggered to consume more power, to consume less power, to generate more power or to generate less power as determined by the server.

Furthermore, nodes 1 to n monitor the frequency of the power at each node, for example using a power meter module, to see if the measured frequency values are exceeding set points that they have received from the server. If they are indeed found to be exceeding them, the node will then provide its discrete response, autonomously, without any further intervention by the server.

For example, with reference to FIG. 7, node 1 informs the server of how much power it is currently consuming (demand) or how much it is currently capable of generating. This is provided to the server as variable a. Similarly, node 2 informs the server of how much power it is currently consuming (demand) or how much it is currently capable of generating. This is provided to the server as variable b. Lastly, node n informs the server of how much power it is currently consuming (demand) or how much it is currently capable of generating. This is provided to the server as variable c. This provides that the server may compute trigger set points based on received inputs a, b and c, the trigger points being frequency set points, individual for each node, at which the node should provide a discrete response. These are sent to each of the nodes 1, 2 and n as trigger set points x, y and z.

Concurrently, each of the nodes, 1, 2, and n are monitoring their operating frequency to see if the measured values are exceeding the set points x, y and z that they have received from the server. If the measured frequency is not exceeded, then the node is not triggered and the node informs the server of how much power it is currently consuming (demand) or how much it is currently capable of generating as described above. See Sections A and B of FIG. 7.

If the measured frequency is exceeded, then the node is triggered. The node then provides a discrete response at the set point provided by the server. This provides that the node can provide its discrete response, autonomously, without any further intervention by the server. As such, with respect to Section C, FIG. 7, nodes 1 and 2 detect that the measured frequency of node operation exceeds the set point provided by the server. As such, nodes 1 and 2 are triggered and provide their configured response, for example, nodes 1 and 2 may adjust their operation to generate more power. In this manner, a proportional response to a change in network demand may be provided by only triggering a required number of nodes, as opposed to all nodes in the network, to meet the requirements of the change. Furthermore, providing individual trigger set points to each nodes allows for a staggered response to be provided to a change in demand, i.e, node 1 may be triggered followed by node 2 followed by additional nodes as required, up to node n. This provides for a more controlled and proportional response to network demand changes.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

What is claimed is:

1. A method of synchronizing communication across a plurality of interconnected modules powered by a common power source; the method comprising the steps of:
    (a) analyzing an input signal of the common power source at a first module of the plurality of modules;
    (b) analyzing the input signal of the common power source at a second module of the plurality of modules;
    (c) detecting a feature in the input signal at a time t1 at the first module;
    (d) detecting the feature in the input signal at a time t3 at the second module; and
    (e) determining an indication of delay in communication between the first module and the second module by either comparing t1 and t3 to a reference time signal at the first module, or comparing t1 and t3 to a reference time signal at the second module.

2. The method of synchronizing communication of claim 1 further comprising the step of adjusting a timing of transmissions from the second module based on the indication of delay.

3. The method of synchronizing communication of claim 1 wherein detecting a feature in the input signal comprises detecting an amplitude peak of the input signal.

4. The method of synchronizing communication of claim 1, wherein:
    (a) the communication across the plurality of interconnected modules comprises transmission of data; and
    (b) the method further comprises the step of adjusting a transmission of data from the second module based on the indication of delay.

5. The method of synchronizing communication of claim 4, wherein adjusting the transmission of data from the second module comprises the steps of:
    (a) transmitting by the second module, at the time t3 that is equal to the time t1 plus a time t2, data that is (i) generated at the time t1 by the first module, and (ii) transferred to the second module at the time t2; and
    (b) transmitting by the second module, at the time t3 that is equal to t1+t2, additional data generated by the second module at the time t1.

6. The method of synchronizing communication of claim 4, wherein adjusting the transmission of data from the second module comprises the steps of:
    (a) transmitting by the second module, at a time t4 that is greater than t1+t23, data that is generated at a time t1 by the first module and that is transferred to the second module at the time t23; and
    (b) transmitting by the second module, at a time t4 that is greater than t1+t3, data generated by the second module at the time t1.

7. The method of synchronizing communication of claim 1 wherein detecting a feature in the input signal comprises detecting an amplitude peak of the input signal.

8. The method of synchronizing communication of claim 1, wherein the reference time signal comprises a global positioning (GPS) time signal.

9. The method of synchronizing communication of claim 8 further comprising the step of adjusting a timing of transmissions from the second module based on the indication of delay for data transmission from the first module to the second module.

* * * * *